United States Patent [19]

Ammons et al.

[11] 3,791,914

[45] Feb. 12, 1974

[54] LAMINATED GLASS ARTICLES

[75] Inventors: Vernon G. Ammons, Glenshaw; Michael E. Dufala, Tarentum, both of Pa.

[73] Assignee: PPG Industries, Inc., Pittsburgh, Pa.

[22] Filed: Jan. 26, 1972

[21] Appl. No.: 221,083

Related U.S. Application Data

[63] Continuation-in-part of Ser. No. 117,164, Feb. 19, 1971, abandoned, which is a continuation of Ser. No. 645,881, June 14, 1967, abandoned.

[52] U.S. Cl............... 161/190, 156/99, 156/106, 161/191, 161/192, 161/404, 161/411, 260/75 NN, 260/77.5 A, 260/77.5 AR, 264/261
[51] Int. Cl..................... B32b 27/40, B32b 17/10
[58] Field of Search... 161/190, 192, 404, 411, 191; 260/2.5 A, 77.5 A, 77.5 AP, 77.5 AR, 77.5 AC, 75 NN; 156/99, 106; 264/261

[56] References Cited
UNITED STATES PATENTS

| | | | |
|---|---|---|---|
| 2,836,575 | 5/1958 | Jones et al. | 260/77.5 AR |
| 2,864,780 | 12/1968 | Katz et al. | 161/190 |
| 3,179,625 | 4/1965 | Ehrhart | 260/77.5 A |
| 3,214,394 | 10/1965 | Schoepfle et al. | 161/190 |
| 3,214,395 | 10/1965 | Schoepfle et al. | 161/190 |
| 3,214,396 | 10/1965 | Schoepfle et al. | 161/190 |
| 3,468,819 | 9/1969 | Szabat | 161/190 |
| 3,505,160 | 4/1970 | Michaels et al. | 161/190 |
| 3,509,015 | 4/1970 | Wismer et al. | 156/99 |

FOREIGN PATENTS OR APPLICATIONS

| | | |
|---|---|---|
| 873,697 | 7/1961 | Great Britain |
| 919,067 | 2/1963 | Great Britain |

*Primary Examiner*—George F. Lesmes
*Assistant Examiner*—Charles E. Lipsey
*Attorney, Agent, or Firm*—Chisholm and Spencer

[57] ABSTRACT

This invention relates to polyurethane resins having reduced adhesion to other materials. It particularly pertains to polyurethane interlayers, especially interlayers utilized in laminated safety glass articles. More particularly, this invention relates to polyurethane compositions comprising the reaction product of an organic polyisocyanate and an organic polyol which has reduced adhesion to other materials due to the inclusion therein of a proton containing compound of phosphorus, preferably acid organic phosphorus compounds.

18 Claims, No Drawings

LAMINATED GLASS ARTICLES

RELATION TO OTHER APPLICATIONS

This application is a continuation-in-part of application Ser. No. 117,164 of Vernon G. Ammons and Michael E. Dufala, filed Feb. 19, 1971, which, in turn, is a streamlined continuation of application Ser. No. 645,881 of Vernon G. Ammons and Michael E. Dufala, filed June 14, 1967, both now abandoned.

BACKGROUND OF INVENTION

Polyurethane resins have achieved considerable commercial utility in recent years as an important plastic for paints, insulating materials, flexible foams, reinforced plastics, and many more products. Usually, the polyurethane resin must have excellent adhesion to other materials in order to be useful. Occasionally, however, reduced adhesion is desirable in certain applications of polyurethane resins. For example, molded polyurethane foams should not adhere to the molds. Also, it has recently been discovered that interlayers for safety glass laminates should have less adhesion than is presently obtained from commercially-available polyvinyl butyral and polyurethane resins.

Laminated glass articles are in wide use, chiefly in glass areas of automobiles, buses, aircraft, and the like. A common term for laminates used in these applications is "safety glass." Safety glass is a glass sandwich composed of an interlayer of material bonding together two or more plates or sheets of glass. The adhesion between the glass plates and the interlayer is such that the breaking of the glass results in a minimum dispersion of fragments of broken glass. U.S. Pat. No. 3,505,160 to George E. Michaels and Raymond G. Rieser discloses that recent developments in safety glass laminates indicate that an optimum adhesion between the glass and the interlayer is preferred. This optimum adhesion is somewhat less than the usual adhesion occurring between common interlayer materials and glass.

In order for a resinous interlayer to be effective for safety glass pruposes, it must have a number of properties including: (1) a high impact energy absorption level so that it may withstand high impact from moving objects (high tensile strength and high percentage of elongation are measures of this property); (2) good shear and tear strength to prevent rupture from broken glass; (3) sufficient adhesion to the glass so as to prevent any broken pieces of glass from flying and injuring persons nearby, that is, the glass-resin laminate should remain integral after it is broken; (4) excellent initial and sustained optical transparency; and (5) good weathering characteristics so that it properly performs its function after many years of use.

Prior to 1929, safety glass was generally of poor quality, especially at temperatures below freezing. None of the resinous compositions which were used as interlayers up to that time maintained their elasticity and adhesion to glass at low temperatures. The more common interlayer compositions which were in use at that time included the acrylates, cellulose acetate, cellulose nitrate, and gelatin. Moreover, the bond between the resinous interlayer and the glass sheets weakened with age. Eventually, the safety glass industry had come to use the autoclave as a means for lamination of the safety glass, and a bond which was acceptable by the industry and the public was attained. Further refinements in the use of autoclaves, such as the "rubber bag" process and the preliminary pressing autoclave process, were later developed to ameliorate the problem of poor edge bonding. A plasticized vinyl alcohol polymer, partially reacted with butyraldehyde (U.S. Pat. No. 2,120,628), was found to overcome brittleness at low temperatures, and an acceptable safety glass was then developed which was effective at low temperatures, especially the temperatures encountered by automobiles in the wintertime.

Although polyvinyl alcohol which has been partially reacted with butyraldehyde (polyvinyl butyral) is in many respects excellent for use as an interlayer for safety glass, it must be employed in sheet form and subsequently laminated between glass sheets at high temperatures (240° to 300°F.) and at pressures between 150 and 200 pounds per square inch. Because of such process limitations, together with the cost of safety glass produced in this manner, laminated safety glass has not been employed to its maximum potential utility. For example, there are architectural applications for interlayers of many varied colors for glass structures having dimensions which cannot be made conveniently from starting materials in sheet form. Also, current required safety factors are approaching the maximum properties obtainable from polyvinyl butyral interlayers.

Many of the aforesaid limitations and disadvantages of polyvinyl butyral interlayers can be eliminated by producing laminates by casting polymer-forming materials between layers of glass. For instance, laminates with a cast and cured-in-place interlayer can be produced by a continuous process. Curing can be accomplished while the unit moves through a tunnel oven, thus eliminating the autoclave which acts as a "bottleneck" in the conventional laminating procedure. Another advantage is that by casting the interlayer, intimate contact and uniform adhesion is obtained throughout the interface between the interlayer and the glass, regardless of any imperfections which may be in the glass surface. In fact, laminated safety glass can be prepared in which the glass parts are deliberately placed in non-parallel positions. In addition, cast and cured-in-place interlayers would eliminate such operations as (1) washing and drying of the polyvinyl butyral sheeting; (2) pattern cutting of the polyvinyl butyral sheeting; and (3) washing away autoclave oil from the finished laminates.

U.S. Pat. No. 3,509,015 to Marco Wismer, Vernon G. Ammons and Michael E. Dufala discloses a polyurethane composition especially useful as an interlayer for safety glass. This particular polyurethane composition does not have the deficiencies of many of the resins which had previously been tried as cast-in-place interlayers. The compositions described in the aforementioned patent formed excellent interlayers having an impact resistance about equivalent to the high impact polyvinyl butyral resins

SUMMARY OF INVENTION

It has now been discovered that polyurethane resins of reduced adhesiveness, especially in a glass laminated structure, can be produced by incorporating therein a small quantity, that is, about 0.01 to about 3.0 per cent by weight, of a proton-containing phosphorus compound, perferably acidic organic phosphorus compounds.

The phosphorus compounds especially useful in this invention are those having a maximum molecular weight of about 1,000 per proton (acid hydrogen) present in the compound, although the preferred molecular weight per proton is less than about 500 while optimum results are achieved when the molecular weight per proton is less than about 200.

The simplest proton-containing compounds useful in this invention are acids such as phosphoric acid and phosphorous acid. The more complex compounds useful in this invention comprise organic derivatives of phosphorus, especially organic esters of these compounds.

The proton of these compounds need not be attached by an oxygen bridge to the phorphorous atom. Useful compounds which do not have the $_-O^-$ [H+] group attached to the phosphorus atom include carboxylic acid derivatives having the general structure

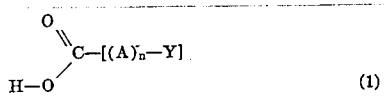 (1)

wherein A is an organic radical, Y is a member of the group consisting of phosphorus. The subscript $n$ represents the number of organic radicals necessary to establish the electroneutrality of the particular phosphorus atom. The number $n$ could be any whole number from 1 to 5, although the more common maximum for $n$ is 3. The expression "organic radical" is intended to include groups wherein a carbon atom may be linked directly to the Y atom or linked via an oxygen atom.

The preferred compounds useful in this invention are those in which the hydrogen atom (proton) is linked mediately to the phosphorus atom. Such compounds have the general structure

 (2)

wherein B is any organic radical and the numbers $m$ and $p$ represent numbers the sum of which satisfy the valence of the Y atom which represents the phosphorus atom. The sum of $m$ plus $p$ will not exceed 3 but may be less.

Although the above formula (2) indicated that the phosphorus atoms have an oxygen atom connected by a coordinate covalent bond, compounds wherein a sulphur atom is substituted for this oxygen atom are also useful.

General types of compounds useful in reducing the adhesiveness of polyurethane resins are described above. The following specific compounds, however, are exemplary of the numerous compounds useful in this invention.

The acids of phosphorus and organic derivatives of phosphorus having at least one acid hydrogen are preferred for the purposes of this invention inasmuch as these compounds exhibit greater acidic properties than neutral phosphorous compounds.

The acids of phosphorus, especially phosphoric and phosphorous acid, are effective additives for a polyurethane interlayer composition. However, where the interlayer must possess exceptional optical properties, e.g., in automobile safety glass laminates, active hydrogen-containing organic esters of phosphorus are preferred. These esters include phosphates such as:
monomethyl phosphate
dimethyl phosphate
monoethyl phosphate
diethyl phosphate
propyl acid phosphate
dibutyl phosphate
amyl acid phosphate
hexyl acid phosphate
dioctyl phosphate
decyl acid phosphate
lauryl acid phosphate
stearyl acid phosphate
oleyl acid phosphate
linolyl acid phosphate
dilinolyl phosphate
monophenyl phosphate
diphenyl phosphate
ditolyl phosphate
benzyl acid phosphate
ethyl phenyl acid phosphate
mono (hydroxymethyl) phosphate
bis (hydroxypropyl) phosphate
bis (hydroxyethyl) phosphate
bis (hydroxy [polyethyleneoxy]) phosphate
and numerous other organic phosphates having at least one active hydrogen.

Another type of active hydrogen-containing organic ester of phosphorus are organic phosphites. Typical organic phosphites useful in this invention include:
monomethyl phosphite
propyl acid phosphite
butyl acid phosphite
hexyl acid phosphite
octyl acid phosphite
lauryl acid phosphite
stearyl acid phosphite
oleyl acid phosphite
linolyl acid phosphite
propylphenyl acid phosphite
naphthyl acid phosphite
tolyl acid phosphite
hydroxyethyl acid phosphite
(hydroxylpolyoxyethylene) acid phosphite
and numerous other organic phosphites having at least one active hydrogen atom.

Other suitable organic phosphorus compounds which are useful in this invention include those wherein the organic group is attached directly to the phosphorus atom. Illustrative of such compounds are the following:

methyl phosphonic acid

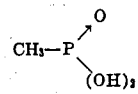

bis (hydroxymethyl) phosphinic acid

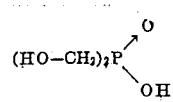

Numerous other compounds of this type such as
ethyl phosphinic acid
butyl phosphinic acid
bis (hydroxylethyl) phosphinic acid
and the like are useful in this invention.

Other suitable organic phosphorus compounds useful in this invention include those wherein the acid hydrogen is provided by a carboxyl group. Such compounds include:

tris (carboxyethyl) phosphate
tris (carboxylpropyl) phosphite and the like.

The adhesion-reducing compounds of this invention are those possessing an acid hydrogen, i.e., proton. The utility of a particular compound in this invention may be determined by measuring its pH in an aqueous solution or by determining its acid number. The pH and acid numbers may be measured according to procedures standard in the art. Typical acid numbers for some of the useful phosphorus compounds are as follows:

| Compound | Acid Number (Mg KOH/gm) |
|---|---|
| methylacid phosphate | 667 |
| n-butyl acid phosphate | 467 |
| amyl acid phosphate | 390 |
| lauryl acid phosphate | 249 |
| stearyl acid phosphate | 207 |
| oleyl acid phosphate | 175 |

It is preferred that the adhesion-reducing compounds have an acid number of above about 50 although lower acid numbers will work. A larger concentration of a compound having a lower acid number is required, however, to accomplish the same result as a compound having a higher acid number.

It has now been discovered that an improved safety glass laminate can be obtained by the addition of an active hydrogen-containing phosphorus compound to a polyurethane composition, especially the polyurethane compositions described in said U.S. Pat. No. 3,509,015. Polyurethane resin interlayers containing an acid hydrogen containing organic ester of an acid of phosphorus, that is, a phosphate or a phosphite, have unexpectedly high impact resistance, especially when the polyurethane resin is the reaction product or an organic polyisocyanate and a polyol.

Compounds of phosphorus, such as organic phosphates and organic phosphites, have previously been added to polyurethane compositions in substantial quantity to promote fire retardancy. However, since fire retardance is not sought in interlayers for safety glass, the incorporation of acid hydrogen-containing phosphorus compounds in polyurethane resin interlayers to promote impact resistance as novel. Also, the quantity of acid hydrogen-containing phosphorus compounds added to polyurethane resins in this invention would be generally insufficient to impart fire retardancy to the resin.

For the purposes of this invention, the quantity of acid hydrogen-containing compounds of phosphorus incorporated in a polyurethane interlayer resin varies with the composition of the polyurethane resin. The invention particularly pertains to the utilization of an amount of such phosphorus compounds which effectively increases the impact resistance of the polyurethane resin interlayer. Quantitatively, the amount of acid hydrogen-containing phosphorus compounds usefully added to polyurethane interlayer compositions falls within the range of about 0.01 per cent by weight to about 3.0 per cent by weight of the polyurethane resin. Preferred quantities of these additives are included in the range of 0.1 per cent by weight to 1.0 per cent by weight of the polyurethane resin.

It is surprising that the impact resistance of a glass laminate containing a polyurethane resin interlayer can be improved so significantly by the incorporation of a minor quantity of the phosphorus compounds described above, such as an alkyl ester of an acid of phosphorus. The impact resistance of such laminates has been increased by about 100 per cent by the inclusion of about 0.08 per cent by weight of an acid hydrogen-containing phosphorus compound, especially alkyl esters of an acid of phosphorus such as a long chain alkyl phosphate. Many of the laminates prepared in accordance with the teaching of this invention have had impact resistances that greatly exceeded that of glass laminates prepared with the strongest polyvinyl butyral interlayers.

POLYURETHANE RESIN DESCRIPTION

The polyurethane resins useful in this invention include those prepared from the reaction of an organic polyisocyanate and a polyol. Preferred polyurethane resins include those described in the aforesaid U.S. Pat. No. 3,509,015. The compositions disclosed in that application are hereby incorporated by reference. Although the polyurethane resins of the above-cited application are preferred, it is to be understood that the invention pertains to an improvement of safety glass polyurethane interlayers generally, in that the inventive feature is the utilization of an additive which surprisingly improves the impact resistance of a glass laminate containing a polyurethane resin interlayer.

In preparing polyurethane resins useful in this invention, the organic polyisocyanates employed are the various organic compounds containing two or more isocyanato groups, or mixtures of such compounds, including aromatic, aliphatic, and cycloaliphatic diisocyanates, triisocyanates, and combinations of these types. Representative compounds include 2,4-toluene diisocyanate, m-phenylene diisocyanate, 4-chloro-1, 3-phenylene diisocyanate, 4,4'-diphenylene diisocyanate, 3,3'-dimethyl-4,4'-diphenylene diisocyanate, 1,5-naphthalene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexyl isocyanate), 1,5-tetrahydronaphthalene diisocyanate, p-xylylene diisocyanate, durene diisocyanate, and 1,2,4,-benzene triisocyanate. Arylene diisocyanates, that is, those in which each of the two isocyanato groups is attached directly to an aromatic ring, are preferred. The sterically hindered types, such as 3,5-diethylmethylene-bis-(4-phenylene isocyanate) and o,o'-diethyl-parabenzene diisocyanate, in which the two isocyanato groups differ greatly in reactivity, are also of interest. The isocyanates may contain other substituents which do not react with isocyanato groups. In the case of the aromatic compounds, the isocyanato groups may be attached either to the same or to different rings. Dimers of monomeric diisocyanates, and di(isocyanatoaryl) ureas such as di-(3-isocyanato-4-methyl-phenyl) urea may be used.

Ordinarily, the amount of polyisocyanate utilized is sufficient to react one equivalent of polyisocyanate per hydroxyl equivalent of the polyol. However, this ratio is not critical except for obtainment of optimum results, higher or lower amounts being employed without adverse results. Higher amounts are preferred in certain cases, as is more fully described below, while lower amounts merely result in less than complete utilization of the polyol in the polyurethane products which may contribute a plasticizing effect on the interlayer.

The polyurethane resins useful as interlayer materials in safety glass may be prepared by reacting all the ingredients in a cell formed by the multiple layers of glass desired to be laminated. Another method of preparing these polyurethanes is the so-called "prepolymer" method in which the polyisocyanate is partially reacted with a polyol to form an isocyanato-terminated adduct, which is then reacted in the cell formed by the safety glass members with additional polyol or other organic material containing active hydrogens. The term "active hydrogen" herein refers to active hydrogen atoms as determined by the Zerewitinoff method, i.e., which are reactive with Zerewitinoff reagent. The organic compounds containing active hydrogens referred to should have at least about two active hydrogen atoms per molecule.

The interlayer may further be prepared in a thermoplastic state by partial reaction of all the ingredients; the thermoplastic material being placed between glass plates and cured to a thermoset state by application of heat. The intermediate thermoplastic polyurethane resin is referred to in the art as a "B-State" resin.

The interlayer may also be fully reacted prior to its insertion between sheets of glass. Such a fully cured interlayer must be softened slightly by heat inasmuch as lamination requires similar techniques to those utilized with polyvinyl butyral resins. Polyurethane interlayers having such properties may be prepared by using a greater percentage of difunctional polyols.

The polyols utilized as a reactant to form polyurethane resin interlayers are organic alcohols containing at least two active hydrogens per molecule. These organic alcohols may include diols, triols, tetrols, and other organic compounds having multiple hydroxyl groups per molecule. Although the polyol is an essential ingredient in the preparation of polyurethane resins utilized in this invention, other organic compounds containing active hydrogen groups, preferably about two active hydrogen groups per molecule, may be utilized. Such other organic compounds containing active hydrogen groups include polyamines, polyamides, and the like.

Polyols useful in the instant invention include diols such as ethylene glycol, 1,4-butanediol or 1,6-hexanediol, but preferred are polyols which have an average of between two and three active hydrogen atoms per molecule and which are compatible with the reaction system, i.e., soluble in the reaction mass. Theoretically, there is no real limit as to the number of hydroxyl groups per molecule of the polyol. As a practical matter, however, the size of the molecule would ultimately affect properties such as solubility, etc., and therefore make its use undesirable. The preferred polyol cure is a combination of diol and triol, particularly a combination of 1,4-butanediol and trimethylolpropane. In many instances the optimum combination is six equivalents of 1,4-butanediol to one equivalent of trimethylolpropane.

Polyols having from two hydroxyls per molecule up to eight and even 10 hydroxyl groups per molecule have been shown to be operative. Examples of polyols which can be employed include trimethylolpropane, trimethylolheptane, trimethylolethane, pentaerythritol, sorbitol, castor oil, the reaction products of allyl alcohol with styrene, polyether polyols, polyester polyols, nitrogen-containing polyols (e.g., reaction products of alkylene oxides with urea or similar compounds), and others.

When a polyol is used as the sole isocyanato reactive materials, it is desirable to include in the reaction mass excess polyisocyanate over the amount required to react with the polyol to form an isocyanato-terminated prepolymer, that is, in excess of one mole of polyisocyanate per hydroxyl equivalent of polyol. Thus, it is preferred to use a total of more than 2 moles of polyisocyanate per mole of glycol when a glycol is the polyol present. Preferably, a total of about 4 moles of polyisocyanate per mole of glycol is present although twice this much or even more can be used. Generally, however, lowered pot life and other processing difficulties, as well as less than optimum properties, are encountered when too large an excess of polyisocyanate is present.

The interlayers of the invention may also be advantageously made by curing the prepolymer or glycol-polyisocyanate blend with a curing system comprising both a polyol having three or more hydroxyl groups and a diol. In such products the various polyols having 3 or more hydroxyls, such as those mentioned above, are employed along with any of a wide variety of diols, for example, the lower molecular weight glycols, such as ethylene, propylene, butylene, pentylene, and higher or substituted alkylene diols, and the various hydroxyl-substituted aryl compounds. Particularly useful are 1,4-butanediol, 2,2-bis (4-hydroxycyclohexyl) propane, 1-5-pentanediol, and 2-methyl-2-n-propyl-1,3-propanediol.

In these curing systems the polyol functions as a cross-linking agent and the diol as a chain extender. In order to obtain optimum results, the curing system is used in such amounts that the total of labile hydrogen atoms is approximately stoichiometrically equal to the free isocyanato groups of the prepolymer. Generally, this means that the amount is within 5 per cent above the stoichiometric point, and preferably is within 3 per cent of stoichiometry.

In order to obtain the optimum results with the various molecular weight poly(oxypolymethylene) glycols, certain diol-polyol ratios should be employed, for example, there are preferably employed about 3.5 equivalents of diol for each equivalent of polyol with the higher molecular weights (1,250 to 1,800), about 6 equivalents of diol for each equivalent of polyol with the intermediate molecular weights (650 to 850), and about 9 equivalents of diol per equivalent of polyol with the lower molecular weights (about 500 to about 650). However, generally satisfactory resinous interlayer compositions can be made with ratios of diol to polyol ranging from 1.5:1 to 10:1. Also, as indicated above, even higher ratios of diol to triol may be utilized when it is desired to produce a heat-softenable interlayer.

It has also been found that the physical properties of the product can be changed to a certain extent by employing either a diol which imparts plasticizing properties to the final polymer or one which imparts rigidity to the final polymer, straight chain poly(butylene oxide) glycol being an example of the former and 2,2-bis(4-hydroxycyclohexyl) propane being an example of the latter. These can permit use of higher or lower molecular weight glycols than those mentioned.

Another type of isocyanato reactive material usable herein comprises a polyamine, preferably in conjunction with a polyol. While it is possible to use a polyamine alone as the curing agent for prepolymers made from poly(oxypolymethylene) glycols, these usually give feasible pot lives only with the higher molecular weight range glycols (e.g., 2,000–3,000). By adding different amounts of various polyols, it is possible to adjust the curing time of the resinous composition to prolong the pot life and also to employ lower molecular weight glycols with good results.

Polyamines having 2, 3, 4, 5, 6, or more reactive amine groups are operative. Particularly desirable are aromatic diamines, such as 4,4'-methylene-bis(2-chloroaniline), diamino diphenyl sulfone, 4,4-diaminobenzophenone and diallyl melamine. Other polyamines which may be used include the aminotriazines such as melamine and the alkyl substituted melamines, benzoguanamine, the aliphatic polyamines and other aromatic diamines such as ortho-, meta-, and para-phenylene diamine, and p,p'-methylene dianiline. Amines, however, are not so desirable as polyols when the polyurethane interlayer is to be used in a transparent product.

Any one of a wide variety of polyols can be utilized along with the polyamine. For example, the lower molecular weight glycols, such as ethylene, propylene, butylene, pentylene, and the higher alkylene diols can be used, as can lower molecular weight poly(alkylene oxide) glycols, such as polypropylene oxide glycol having a molecular weight between 250 and 400, and various hydroxyl-substituted aryl compounds. Particularly useful are 1,4-butanediol, 1,5-pentanediol, 2,2-bis-(4-hydroxycyclohexyl) propane, reaction products of polyols with alkylene oxides, trimethylolpropane, trimethylolethane, pentaerythritol, caster oil, reaction products of allyl alcohol and styrene, and trimethylolheptane.

It is usually desirable that the labile hydrogen atoms of the polyamine-polyol curing system be stoichiometrically balanced with the isocyanate radicals of the prepolymer. However, fairly good properties are obtained when less than the theoretical amount of the labile hydrogen atoms are present, in which case many of the thus formed urea hydrogen atoms probably react with the remaining isocyanate radicals to produce crosslinking, wherein some of the nitrogens of the polyurea are tertiary and form a biuret-type linkage. While it is possible to use as little as 50 per cent of the theoretical stoichiometric amount of the curing components, it is preferred that at least 80 per cent of the stoichiometric amounts be employed; an excess over the theoretical amount can also be tolerated.

The resinous interlayer is ordinarily prepared by first heating a "prepolymer" of the polyol and polyisocyanate (or these components themselves) under a vacuum for about 1 to 2 hours. The prepolymer is then mixed with the curing agent in a suitable vessel. The mixture is then further heated under a vacuum in order to remove any gases which are present or which were entrained during the mixing. Removal of the trapped and entrained gases throughout the production of the laminate is desirable in order to avoid bubbles and the like.

The preparation of cast interlayer laminates can be carried out in many ways. A relatively simple but useful method is by either pouring uncured reaction mixture between two planar spaced glass plates or placing the mixture upon both plates and pressing them together. Multi-layer safety glass wherein several glass and polyurethane layers are bounded together is produced similarly. In some cases, only one layer of glass is used along with the polyurethane interlayer, with the other interlayer surface being exposed or covered with a layer of plastic or other material; such laminates can be produced by casting the polyurethane between one glass sheet and another member (made of glass or other material) which is coated with a release agent. Spacers are usually employed around the perimeter to insure uniform thickness of the interlayer. In order to obtain optimum results, the glass-polyurethane assembly is cured, usually by heating to a temperature between about 200° and about 300° F. for at least one-half hour.

Various mechanical devices may be employed to aid in introducing the resinous material. One particularly advantageous method is to seal the periphery of two sheets of glass with a pressure-sensitive tape, such as polyethylene terephthalate (Mylar) tape, and force the resinous interlayer with the aid of moderate pressure into the space between the sheets of glass. Maximum pressures between about 10 psig or less and about 100 psig are generally employed. The resinous material is conveniently forced through a self-closing valve which is held in place with the tape while the trapped air is discharged through an aperture in the taped seam at the top. The tape may or may not be left on during and after curing.

In the following examples the designation Adiprene L-167 defines a polyisocyanate prepolymer of toluene diisocyanate and poly(oxypolymethylene) glycol; said prepolymer having an equivalent weight of about 661 and the following structural formula:

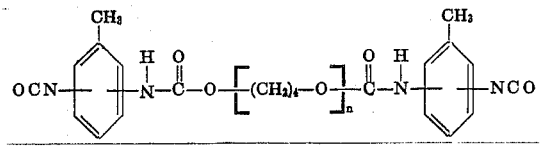

wherein $n$ is about 13.

The designation Adiprene L-315 as used in this application defines a prepolymer of the above structure wherein n is about 7. Its equivalent weight is about 455.

POLYURETHANE FORMULATION A

A typical polyurethane formulation useful in the preparation of interlayers for safety glass laminates has the following composition:

| Ingredient | Eq. Wt. | Eqs. | Wt. Ratios |
| --- | --- | --- | --- |
| Adiprene L-167 | 661 | 0.1200 | 79.37 |
| Tolylene diisocyanate (TDI) | 87 | 0.2371 | 20.63 |
| *Tinuvin P | — | — | 0.10 |
| 1,4-Butanediol | 45 | 0.3061 | 13.77 |
| Trimethylolpropane | 44.7 | 0.0510 | 2.28 |

*Tinuvin P is the trademark for a family of ultraviolet light absorbers based on substituted hydroxyphenyl benzotriazoles.

POLYURETHANE FORMULATION B

Another polyurethane interlayer material for safety glass laminates is prepared from the following:

| Ingredient | Eq. Wt. | Eqs. | Wt. Ratios |
|---|---|---|---|
| Adiprene L-315 | 455 | 0.168 | 75.0 |
| Adiprene L-167 | 661 | 0.037 | 25.0 |
| 1,4-Butanediol | 45 | 0.183 | 8.2 |
| Trimethylolpropane | 44.7 | 0.022 | 1.0 |
| Tinuvin P | — | — | 0.1 |

POLYURETHANE FORMULATION C

| Ingredient | Eq. Wt. | Eqs. | Wt. Ratios |
|---|---|---|---|
| Adiprene L-167 | 661 | 0.0445 | 30.00 |
| Adiprene L-315 | 455 | 0.1538 | 70.00 |
| 1,4-Cyclohexane-dimethanol | 72 | 0.1698 | 12.22 |
| Trimethylolpropane | 44.7 | 0.0285 | 1.27 |

In the following examples the laminates were prepared by in situ reaction of the polyurethane resin in a cell having walls formed of the members to be laminated. The invention, however, is not limited to laminates formed solely by this process. The polyurethane resin may be a thermoplastic resin, being fully reacted prior to lamination; or it may be only partially reacted, i.e., a B-stage resin prior to lamination.

EXAMPLE I

In this example the results of testing of a number of glass laminates are reported. Many of these laminates were prepared according to the teaching of this invention; other laminates not prepared with the novel interlayer material of this invention are included for the purpose of comparison.

In this example the laminates were prepared from Polyurethane Formulation A as the base resin with minor amounts of additives as shown in the following table.

The laminates were formed from two sheets of glass of dimensions ⅛ by 12 inches by 12 inches. A casting cell was formed from these sheets by placing them with their faces in a parallel relation approximately 0.030 inch apart. Spacing elements were placed between the sheets to maintain a minimum spacing of about 0.030 inch. The sheets were then taped about the outer edge to form a liquid tight casting cell with an opening across one edge only. The cells were then clamped to maintain a spacing of about 0.030 inch between faces of the cell.

The polyurethane resin was prepared in the following manner:

a. The isocyanate components (Adiprene L-167 and tolylene diisocyanate), light stabilizer and acid hydrogen containing compound were thoroughly admixed, then heated to about 130°F. and placed under vacuum for about 15 minutes to remove entrapped gases;

b. The polyol components (1,4-butanediol and trimethylolpropane) and any additives were thoroughly admixed and degased in a manner similar to the isocyanate components;

c. The isocyanate mixture and the polyol mixture were then admixed at about 110°F. (exotherm to about 175°F.) for a period of about 4-½ minutes.

The admixed resin was then poured into a casting cell of the type described above and cured for about 1-½ hours at a temperature of about 285°F.

Laminates prepared in this manner were tested at 76°F. for breakage resistance to a 5 lb. steel ball dropped perpendicularly from various distances upon the face of the laminate. The laminated article was supported along its edges during this test.

The adhesion of the interlayer material to the glass was also determined. This was determined by placing the laminated article upon a flat rigid surface at zero degrees Fahrenheit and striking the upper face of the laminate with a hammer. The adhesive quality of the interlayer was then determined by estimating the interlayer surface area exposed. If the impact resulted in substantially no interlayer exposed in the impact area, the adhesion of the interlayer to glass was rated as A+. If the impact resulted in a substantial exposure of interlayer, the interlayer was given a C rating for adhesion.

An adhesion rating of A− to B+ is generally preferred for automotive safety glass laminates, although adhesion ratings of B− and C+ may be acceptable under certain conditions.

The adhesion of glass to interlayer material is desirable in preventing injury by flying glass fragments to occupants of an automobile involved in a collision.

The following table illustrates the effect upon laminate properties of various phosphate and phosphite additives in varying minor amounts when incorporated in an interlayer material of Polyurethane Formulation A set forth hereinabove. In the following table, the concentration of phosphorus compound present in the interlayer is given as parts by weight of phosphorus compound per 100 parts by weight of Polyurethane Formulation A.

The ball drop test was conducted at 76°F. The height given in the table represents the maximum height that the ball was dropped without penetrating the laminate.

The optical properties of these laminates were satisfactory for automotive safety glass purposes.

Interlayers based on Polyurethane Formulation A without any additives had an A+ adhesion to glass and formed laminates with ⅛-inch thick glass that pass the 5 lb. ball drop test at 4 − 5 feet at 0°F., 13 − 15 feet at 76°F., and 14 − 15 feet at 120°F.

TABLE I

| Phosphorus Compound | Concentration | 5 lb. Ball Drop Results (feet) | Adhesion Rating |
|---|---|---|---|
| None | 0.0 | 13–15 | A+ |
| Stearyl Acid Phosphate | 0.3 | 25 | C |
| Stearyl Acid Phosphate | 0.2 | 23 | C |
| Stearyl Acid Phosphate | 0.1 | 23–24 | C |
| Stearyl Acid Phosphate | 0.05 | 15–16 | A |
| *Zelec UN | 0.3 | 23 | C |
| Zelec UN | 0.2 | 25 | C+ |
| Zelec UN | 0.1 | <20 | B+ |
| **Triphenyl Phosphate | 0.3 | 15 | A+ |
| Octylphenyl Acid Phosphate | 0.1 | 17 | A+ |

TABLE I-Continued

| Phosphorus Compound | Concentration | 5 lb. Ball Drop Results (feet) | Adhesion Rating |
|---|---|---|---|
| Isooctyl Acid Phosphate | 0.1 | 18–19 | B+ |
| Isooctyl Acid Phosphate | 0.2 | 21–22 | C+ |
| Isooctyl Acid Phosphate | 0.3 | <20 | C+ |
| Methyl Acid Phosphate | 0.1 | 22–23 | B+ |
| Methyl Acid Phosphate | 0.2 | 22 | B+ |
| Methyl Acid Phosphate | 0.3 | — | B+ |
| Butyl Acid Phosphate | 0.2 | <20 | A+ |
| Amyl Acid Phosphate | 0.2 | 17 | B+ |
| Lauryl Acid Phosphate | 0.2 | 21–22 | C |
| Lauryl Acid Phosphate | 0.1 | 20 | C+ |
| High Monostearyl Acid Phosphate | 0.2 | <24 | C |
| Oleyl Acid Phosphate | 0.2 | <22 | B+ |

*Proprietary fatty alcohol phosphate product of E. I. du Pont de Nemours and Company having an acid number of about 283, an equivalent weight of about 200, and the following elemental analysis: Hydrogen — 10.86; Carbon — 57.22; Phosphorus — 9.89; Oxygen — 22.03. All figures represent parts by weight of element present.
**Triphenyl phosphate has no acid hydrogen present, i.e., zero acid number, but was tried for comparison purposes.

EXAMPLE II

Laminates were prepared in the manner outlined in Example I from 12 × 12 inch glass sheets of ⅛-inch thickness and interlayers based on Polyurethane Formulation B which contains 0.1 parts by weight of methyl acid phosphate per 100 parts of isocyanate components present. The interlayer was approximately 0.030 inch thick.

Five of these laminates were prepared. The following table illustrates the results of these laminates when subjected to the ball drop test.

TABLE II

| Laminate | Interlayer Thickness | Laminate Temperature | (feet) 5 lb. Ball Drop | Result |
|---|---|---|---|---|
| A | 0.031 | 78°F. | 20 | *Failed |
| B | 0.030 | 78°F. | 17 | Passed |
| C | 0.030 | 78°F. | 17 | Passed |
| D | 0.028 | 0°F. | 7 | *Failed |
| E | 0.029 | 120°F. | 13 | *Failed |

*Failed indicates that the laminate did not retain the ball.

The adhesion of these laminates to glass was within the range of B+ to A.

The interlayer had excellent optical properties.

Similar results are obtainable when methyl acid phosphite is substituted for methyl acid phosphate in the above formulation.

EXAMPLE III

Laminates were prepared in the manner set forth in Example I from a phosphoric acid containing interlayer material based on Polyurethane Formulation A. Phosphoric acid was present in the interlayer in the ratio of 0.2 parts per 100 parts of isocyanate components present.

The following table illustrates the effectiveness of this interlayer material for safety glass laminates.

TABLE III

| Laminate | Interlayer Thickness | Laminate Temperature | (feet) 5 lb. Ball Drop | Result |
|---|---|---|---|---|
| A | 0.033 | 78°F. | 20 | Passed |
| B | 0.033 | 78°F. | 22 | Passed |
| C | 0.032 | 78°F. | 23 | Passed |
| D | 0.029 | 120°F. | 14 | Passed |

The 0°F. crush test indicated an A adhesion between the interlayer and glass.

The interlayer had a light yellow color and was hazy. Thus, it would not be as useful as the interlayer described in Examples I and II in laminates requiring excellent optics.

EXAMPLE IV

A comparison of tensile strength and elongation values was made between interlayers formed from Polyurethane Formulation A and from a resin based on Formulation A containing 0.1 parts of methyl acid phosphate per 100 parts of isocyanate components present.

The resins are designated Resin A and Resin A(MP) to indicate the presence in the latter resin of methyl acid phosphate.

The tensile and elongation were tested on an Instron machine at various temperatures with a 2 inch spacing between the jaws of the machine.

| Temperature | Resin A | | Resin A(MP) | |
|---|---|---|---|---|
| | Elongation (%) (Average Value) | Tensile (psi) | Elongation (%) (Average Value) | Tensile (psi) |
| 70°F. | 380 | 8836 | 400 | 9262 |
| 200°F. | 250 | 1240 | 235 | 988 |
| 300°F. | 80 | 436 | 90 | 438 |

The above values were the average of four or more samples.

EXAMPLE V

Addition of a Phosphate Containing No Acid Hydrogen Atom

For purposes of comparison, laminates were prepared in the manner described in Example I from an interlayer material based on Polyurethane Formulation A containing trimethyl phosphate at a concentration of 0.2 parts per 100 parts of isocyanate components present.

These glass laminates failed the ball drop test at heights of 12 feet and above. The adhesion as determined by the 0°F. crush test was A+.

Triphenyl phosphite was added to Polyurethane Resin B as 5 parts per 100 parts of isocyanate. A glass laminate having an interlayer of this material failed the ball drop test at 13 feet.

Other materials tried but found ineffective for the purposes of this invention were butyl stearate, butyl oleate, stearic acid, oleic acid, 2-ethyl hexoic acid, sodium stearate, zinc stearate, and aluminum stearate. Some of these materials were incompatible in the resin, e.g., zinc and aluminum stearates, while most of the others had little effect upon adhesion between the resin and glass.

Dimethyl phosphite and dilauryl phosphite were also tried in Polyurethane Formulation A for use as an interlayer material. No advantage was derived from the addition of these phosphites. This is consistent with the proposed explanation of the invention above if the structure of these compounds is considered to be

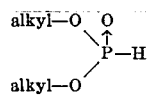

wherein an acid hydrogen is not present.

In the above examples, a preferred manner of formulating the novel polyurethane resins of this invention has been described. It is generally preferred, for example, to add the acid hydrogen containing material to the isocyanate components prior to admixture with the polyol components. However, such material could be added to the polyol components or during the admixing of the isocyanate components with the polyol components.

While specific examples of the invention have been set forth hereinabove, it is not intended to limit the invention solely thereto but to include all the variations and modifications falling within the scope of the appended claims.

We claim:

1. A laminated glass window comprising at least one solid glass sheet and bonded thereto an adherent, solid transparent layer of a polyurethane resin derived from an organic polyisocyanate and an organic polyol, and containing about 0.01 per cent by weight to about 3.0 per cent by weight of an alkyl acid phosphorus ester; said percentage of alkyl acid phosphorus ester being sufficient to reduce the normal adhesiveness of the polyurethane to glass in the laminated glass window and to increase its impact resistance, such that when the polyurethane is adhered to and sandwiched between two ⅛-inch thick, 12 by 12-inch glass sheets to form a laminate, and the polyurethane layer is approximately 0.030 inch thick the laminate retains a 5 pound steel ball dropped perpendicularly from a distance greater than 17 feet at 76°F.

2. The laminated window of claim 1 wherein the alkyl acid phosphorus ester has a molecular weight of less than about 1,000 per acid hydrogen present in the ester.

3. The laminated window of claim 1 wherein the alkyl acid phosphorus ester has an acid number above about 50.

4. The laminated window of claim 1 wherein the alkyl acid phosphorus ester is an alkyl acid phosphate.

5. The laminated window of claim 4 wherein the alkyl acid phosphate is methyl acid phosphate.

6. The laminated window of claim 1, wherein the alkyl acid phosphorus ester is an alkyl acid phosphite.

7. A safety glass laminate of a plurality of solid glass sheets having disposed between adjacent sheets an adherent, transparent, solid interlayer material bonding said sheets of glass together, said interlayer material comprising a polyurethane resin derived from an organic polyisocyanate and an organic polyol, and containing about 0.01 to about 3.0 per cent by weight of an alkyl acid phosphorus ester; said percentage of alkyl acid phosphorus ester being sufficient to reduce the normal adhesiveness of the polyurethane to glass in the laminated glass window and to increase its impact resistance such that when the polyurethane is adhered to and sandwiched between two ⅛-inch thick, 12 by 12-inch glass sheets to form a laminate, and the laminate is held rigid and the polyurethane layer is approximately 0.030 inch thick the laminate retains a 5 pound steel ball dropped perpendicularly from a distance greater than 17 feet at 76°F.

8. The safety glass laminate of claim 7 wherein the alkyl acid phosphorus ester has a molecular weight of less than about 1,000 per acid hydrogen present in the ester.

9. The safety-glass laminate of claim 7 wherein the alkyl acid phosphorus ester has an acid number above about 50.

10. The safety glass laminate of claim 7 wherein the alkyl acid phosphorus ester is an alkyl acid phosphate.

11. The safety glass laminate of claim 7 wherein the alkyl acid phosphorus ester is an alkyl acid phosphite.

12. The safety glass laminate of claim 10 wherein the alkyl phosphate is stearyl acid phosphate.

13. The safety glass laminate of claim 10 wherein the alkyl phosphate is octylphenyl acid phosphate.

14. The safety glass laminate of claim 10 wherein the alkyl phosphate is isooctyl acid phosphate.

15. The safety glass laminate of claim 10 wherein the alkyl phosphate is methyl acid phosphate.

16. The safety glass laminate of claim 10 wherein the alkyl phosphate is butyl acid phosphate.

17. The safety glass laminate of claim 10 wherein the alkyl acid phosphate is lauryl acid phosphate.

18. The safety glass laminate of claim 4 wherein the alkyl acid phosphate is lauryl acid phosphate.

* * * * *

UNITED STATES PATENT OFFICE
CERTIFICATE OF CORRECTION

Patent No. 3,791,914          Dated February 12, 1974

Inventor(s) Vernon G. Ammons and Michael E. Dufala

It is certified that error appears in the above-identified patent and that said Letters Patent are hereby corrected as shown below:

Column 5, line 45, "retardance" should be --retardancy--.

Column 5, line 48, "as" should be --is--.

Column 13, in Table I, under the column entitled "5 lb. Ball Drop Results (feet)", next to last number, " < 24" should be -- > 24--.

Signed and sealed this 2nd day of July 1974.

(SEAL)
Attest:

EDWARD M. FLETCHER, JR.          C. MARSHALL DANN
Attesting Officer          Commissioner of Patents